United States Patent
Nitta et al.

(10) Patent No.: US 7,882,920 B2
(45) Date of Patent: Feb. 8, 2011

(54) VEHICLE BRAKING FORCE CONTROLLER

(75) Inventors: Chihiro Nitta, Anjo (JP); Kazuhide Adachi, Anjo (JP); Hideaki Morita, Nishio (JP); Manabu Matsuda, Anjo (JP); Kazushi Konno, Chita (JP); Shoko Yokoyama, Anjo (JP)

(73) Assignees: Advics Co., Ltd., Kariya, Aichi-Pref. (JP); Aisin AW Co., Ltd., Anjo-Shi, Aichi (JP); Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 226 days.

(21) Appl. No.: 12/265,416

(22) Filed: Nov. 5, 2008

(65) Prior Publication Data

US 2009/0124457 A1 May 14, 2009

(30) Foreign Application Priority Data

Nov. 8, 2007 (JP) ............................. 2007-290935

(51) Int. Cl.
*B60T 7/12* (2006.01)
(52) U.S. Cl. ........................... 180/268; 701/45; 701/51; 701/62; 701/70; 477/93; 477/170; 477/184
(58) Field of Classification Search ................ 180/268, 180/269, 270, 271, 273, 275, 279; 701/36, 701/45, 48, 51, 53, 62, 70; 477/92–94, 170, 477/182–184
See application file for complete search history.

(56) References Cited

U.S. PATENT DOCUMENTS

| 6,370,466 B1* | 4/2002 | Hada et al. ..................... 701/70 |
| 2002/0132702 A1* | 9/2002 | Muramoto .................. 477/183 |
| 2003/0225501 A1* | 12/2003 | De La Salle et al. .......... 701/93 |
| 2004/0226768 A1* | 11/2004 | DeLuca et al. .............. 180/275 |
| 2005/0030184 A1* | 2/2005 | Victor ........................ 340/576 |
| 2005/0096829 A1* | 5/2005 | Sugano et al. ................ 701/70 |
| 2005/0131587 A1* | 6/2005 | Takamatsu ..................... 701/1 |
| 2006/0183600 A1* | 8/2006 | Kamikado ................... 477/182 |
| 2007/0179020 A1* | 8/2007 | Sokoll ........................ 477/182 |
| 2009/0112432 A1* | 4/2009 | Ueoka et al. .................. 701/70 |

FOREIGN PATENT DOCUMENTS

JP A-2007-55474 3/2007

* cited by examiner

*Primary Examiner*—Ruth Ilan
(74) *Attorney, Agent, or Firm*—Buchanan Ingersoll & Rooney PC

(57) ABSTRACT

A braking force application control is performed when a change in a driver's posture takes place while a brake pedal is turned on when a vehicle is stopped. As a consequence, in a case in which the driver's posture changes such as when the driver turns to a rear seat side to get something without intending to release depression of the brake pedal, creep of the vehicle that the driver does not intend to happen can be inhibited. Furthermore, the vehicle stop retention is only performed when a travelling direction is a forward direction or a seatbelt is worn. As a result, performance of the vehicle stop retention can be inhibited when it is considered that the driver intentionally desires to let the vehicle creep.

20 Claims, 8 Drawing Sheets

VEHICLE BRAKING FORCE CONTROLLER

CROSS REFERENCE TO RELATED APPLICATION

This application is based upon and claims the benefit of Japanese Patent Application No. 2007-290935 filed on Nov. 8, 2007, the content of which are incorporated herein by reference.

FIELD OF THE INVENTION

The invention relates to a vehicle braking force controller which inhibits a vehicle from starting to move from a stopped state when a driver does not intend the vehicle to move, while allowing the vehicle to move in a creeping manner in which the vehicle runs slowly when an accelerator pedal is not depressed by the driver.

RELATED ART OF THE INVENTION

In related art, namely, Japanese Patent Application Publication JP-A-2007-055474, a device is disclosed that performs a vehicle stop retention control in which a stopped state is maintained irrespective of a driver's brake operation. The device starts the vehicle stop retention control when an accelerator opening degree becomes smaller than an accelerator off threshold value at which the accelerator is assumed to be off, a vehicle speed is zero, and the brake is turned on by depression of a brake pedal. On the other hand, the device cancels the vehicle stop retention control when the accelerator opening degree becomes larger than an accelerator on threshold value at which the accelerator is assumed to be on. As a result, the vehicle can be kept from starting to move from the stopped state when the driver does not intend the vehicle to move, while allowing the vehicle to creep.

Nevertheless, with the device disclosed in the Japanese Patent Application Publication JP-A-2007-055474 above, once the vehicle stop retention control is started, the vehicle stop retention control is not canceled unless the accelerator opening degree becomes larger than the accelerator on threshold value. Therefore, unless this condition is met, the vehicle stop retention is maintained in all circumstances. Accordingly, if the driver intends to let the vehicle creep, such as when the driver wants to drive at a low speed without depressing an accelerator pedal during traffic congestion or at an intersection, it is not possible for the vehicle to creep. In other words, the vehicle stop retention control is maintained even though the driver intends to cancel the vehicle stop retention control, and thus creep of the vehicle is inhibited. Therefore, it is desirable to discontinue the vehicle stop retention control regardless of whether the driver intends to cancel the vehicle stop retention control. Meanwhile, it is also necessary to keep the vehicle from starting to move from the stopped state when the driver does not intend the vehicle to move, so long as the vehicle retention control is not being performed.

SUMMARY OF THE INVENTION

The invention has been devised in consideration of the problems described above, and it is an object of the present invention to provide a vehicle braking force controller which can inhibit a vehicle from starting to move from a stopped state when a driver does not intend the vehicle to move, while allowing the vehicle to creep.

According to a first aspect of the invention, when a change in a driver's posture is detected by posture change detection portion in a state in which stop determination portion determines that a vehicle is stopped and a brake operation detection portion detects operation of a brake pedal, braking force application control portion transmits a control signal to braking force generation portion for generating a braking force, thereby performing vehicle stop retention.

As described above, when the vehicle is in a stopped state, a braking force application control is performed when there is a change in the driver's posture while the brake pedal is being operated. Therefore, in a case in which the driver has no intention of releasing depression of the brake pedal, and when a change takes place in the driver's posture such as when the driver turns toward a rear seat side to get something, creep of the vehicle against the driver's intention can be inhibited.

In this configuration, according to a second aspect of the invention, it is preferable to provide travelling direction detection portion for detecting a travelling direction of the vehicle. Furthermore, it is preferable that the vehicle stop retention is performed when the travelling direction detection portion detects that the travelling direction is a forward direction, and the vehicle stop retention is not performed when the travelling direction detection portion detects that the travelling direction is a backward direction For instance, when the depression of the brake pedal is released when the travelling direction is the forward direction, the driver may have unintentionally released the pedal depression. On the other hand, when the depression of the brake pedal is released when the travelling direction is the backward direction, there is a high possibility that the pedal depression has been intentionally released by the driver, for example, such as when backing the vehicle into a garage. Accordingly, by performing the vehicle stop retention only when the travelling direction is the forward direction, the performance of the vehicle stop retention can be inhibited when it is considered that the driver intends to let the vehicle creep.

Similarly, according to a third aspect of the invention, seatbelt-wearing detection portion for detecting whether or not a seatbelt of a driver's seat on which the driver sits is worn. Furthermore, the vehicle stop retention is performed when the seatbelt-wearing detection portion detects that the seatbelt is worn, and the vehicle stop retention is not performed when the seatbelt-wearing detection portion detects that the seatbelt is not worn.

For example, there is a case in which the driver desires to let the vehicle run at a low speed while checking a parking space with a window open, such as when parallel parking the vehicle. In this case, the driver may unbuckle the seatbelt, and this condition is considered that the driver intentionally wants to let the vehicle creep. Accordingly, by performing the vehicle stop retention only when the seatbelt is worn, the execution of the vehicle stop retention can be inhibited in a case in which it is considered to indicate that the driver intends to let the vehicle creep.

For instance, according to a fourth aspect of the invention, the braking force application control portion outputs the control signal to at least one of the brake control actuators, an electric parking brake, and a transmission that serve as the braking force generation portion, and drives the brake control actuators and the electric parking brake or sets a gear position of the transmission in a parking range, thereby generating the braking force.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENTS

Figure 1:
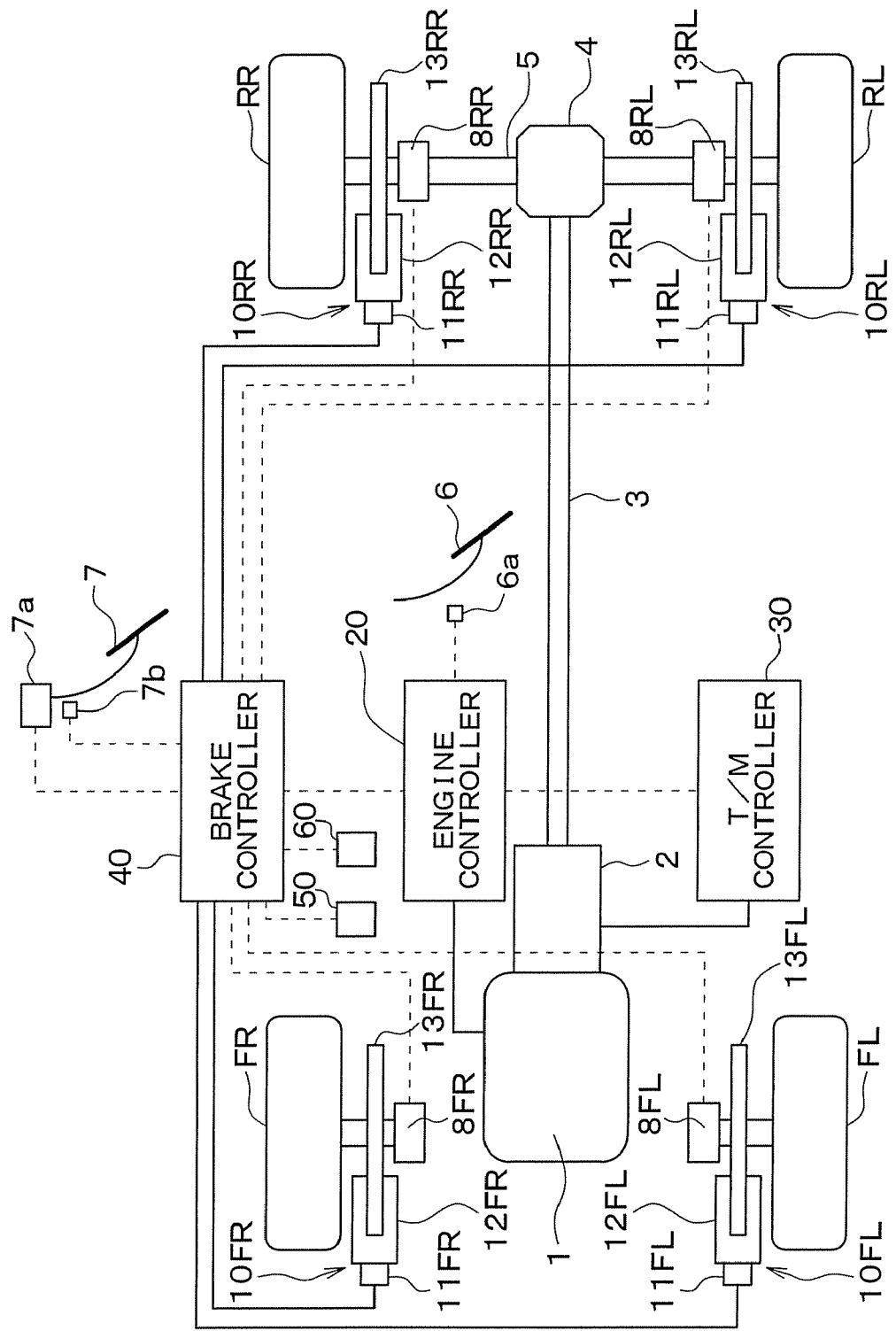
FIG. 1 is a figure illustrating a schematic structure of an overall system which includes a vehicle braking force controller according to a first embodiment of the invention.

The present invention will be described further with reference to various embodiments in the drawings.

First Embodiment

FIG. 1 shows a schematic structure of an overall system that includes a vehicle braking force controller which achieves a vehicle stop retention control of the first embodiment of the invention. Here, a description will be given of a case in which the vehicle braking force controller, that is one embodiment of the invention, is applied to a front-engine rear-wheel drive vehicle which has an engine 1 mounted in the front and uses right and left rear wheels as driving wheels. However, the vehicle braking force controller of the invention is also applicable to other types of vehicles such as a front-engine front-wheel drive vehicle which uses right and left front wheels as the driving wheels.

As shown in FIG. 1, a driving system of the front-engine rear-wheel drive vehicle includes the engine 1, a transmission 2, a propeller shaft 3, a differential 4, and a drive shaft 5. Through these members, driving force is applied to the right and left rear wheels which serve as the driving wheels. Specifically, an engine output (engine torque) generated in accordance with an operation amount of an accelerator pedal 6 is transmitted to the transmission 2. Then, the transmission 2 converts the engine output based on a gear ratio which corresponds to a set gear position, and then the driving force is transmitted to the propeller shaft 3. Thereafter, the driving force is applied to the right and left rear wheels via the drive shaft 5 connected to the propeller shaft 3 via the differential 4.

Furthermore, a braking system includes brake control actuators 10FR, 10FL, 10RR, and 10RL provided in the front and rear right wheels FR and FL and front and rear left wheels RR and RL, respectively. Braking force is applied to the wheels FR to RL respectively by controlling the brake control actuators 10FR to 10RL. Specifically, the brake control actuators 10FR to 10RL are structured as a brake system which can automatically pressurize wheel cylinders (hereafter called W/Cs) 11FR, 11FL, 11RR, and 11RL. As the brake control actuators 10FR to 10RL, either an electric braking system such as a brake-by-wire which electrically generates W/C pressures or a hydraulic braking system which hydraulically generates the W/C pressures can be used. Both of these systems are already known, and thus a description of the specific structure of the brake control actuators 10FR to 10RL is omitted here. However, in the following description, a case in which the brake control actuators 10FR to 10RL are structured as the electric braking system will be explained as an example.

In the brake control actuators 10FR to 10RL, by changing an indication current value which indicates a current to be supplied to an electric motor (not shown in the figures), a W/C among the W/Cs 11FR to 11RL, which corresponds to a wheel subject to the control, is pressurized or depressurized. By this operation, a retention force of calipers 12FR, 12FL, 12RR, and 12RL that holds disk rotor 13FR, 13FL, 13RR, and 13RL is adjusted, thereby controlling a braking force generated on each of the wheels FR to FL.

The system includes an engine controller (hereafter called the engine ECU) 20 which controls the driving system, a transmission controller (hereafter called the T/M-ECU) 30, and a brake controller (hereafter called the brake ECU) 40 which controls the braking system.

The engine ECU 20 includes a known micro-computer having a CPU, a ROM, a RAM, an I/O, and the like, and controls an engine output (engine torque) by performing various calculations and processes based on programs stored in the ROM and the like, thereby controlling a driving force generated on the rear right and left wheels RR, RL. For example, the engine ECU 20 inputs an accelerator opening degree by a known method and calculates the engine output based on the accelerator opening degree and various engine controls. Then, the engine ECU 20 outputs a control signal to the engine 1, thereby adjusting a fuel injection volume and the like to control the engine output. The engine ECU 20 can determine that the accelerator pedal 6 is turned on when the accelerator opening degree is larger than the accelerator on threshold value. In addition, if an accelerator switch 6a which indicates whether or not the accelerator pedal 6 is being operated is provided, it can also be determined whether or not the accelerator pedal 6 is turned on by inputting a detection signal from the accelerator switch 6a.

The T/M-ECU 30 includes a known micro-computer having a CPU, a ROM, a RAM, an I/O, and the like, and selects a gear position of the transmission 2 and the like through execution of various calculations and processes based on programs stored in the ROM and the like. The T/M-ECU 30 exchanges information with the engine ECU 20 and transmits information about the gear position of the transmission 2 to the engine ECU 20. Therefore, the engine ECU 20 described above calculates the engine output while taking into account the operation amount of the accelerator pedal 6 as well as the gear position of the transmission 2 included in the information transmitted from the T/M-ECU 30.

The brake ECU 40 corresponds to braking force application control portion and includes a known micro-computer which is provided with a CPU, a ROM, a RAM, an I/O, a counter, and the like. The brake ECU 40 executes various calculations and processes based on programs stored in the ROM and the like, and thereby generates a braking force on each of the wheels FR to RL. The braking force corresponds with the operation amount (stroke or pedal depression force) of the brake pedal 7, or a braking force for performing the vehicle stop retention control of the invention. For example, the brake ECU 40 inputs a detection signal from a brake operation amount sensor (such as a stroke sensor or a pedal depression force sensor) 7*b* which indicates the operation amount of the brake pedal 7, and a detection signal from a brake switch 7*a* which indicates whether or not the brake pedal 7 is being operated. Based on the detection signals, the brake ECU 40 calculates the brake operation amount and determines whether or not the brake pedal 7 is turned on. Furthermore, the brake ECU 40 receives detection signals from wheel speed sensors 8FR, 8FL, 8RR, and 8RL provided on respective wheels FR to RL to obtain a speed of each wheel. Also, based on the obtained wheel speed of respective wheels, the brake ECU 40 calculates an estimated vehicle speed (hereafter simply called the vehicle speed). Then, the brake ECU 40 outputs a control signal to the bake control actuators 10FR to 10RL, thereby controlling a W/C pressure generated on the respective W/Cs 11FR to 11RL to control the braking force generated on the respective wheels FR to RL.

Furthermore, the brake ECU 40 is input with detection signals from a posture detecting device 50 which detects a driver's posture and a seatbelt-wearing detection device 60 which detects whether of not the driver is wearing a seatbelt.

The posture detecting device 50 includes, for instance, load sensors disposed under a driver's seat. The load sensors are provided, respectively, on each of four connecting elements that are disposed at four locations on the driver's seat that is slidably fitted to the seat rails. The posture detecting device 50 detects a load applied to each connecting element by each load sensor, and detects the driver's posture based on the detected load. That is, the posture detecting device 50 detects that the driver's posture has not changed if no change takes place in the load detected by each load sensor, and that the driver's posture has been changed if a change takes place in the detected load. The posture detecting device 50 is of the same kind as that disclosed in the Japanese Patent Application Publication JP-A-2006-266706 and the like, and thus a detailed description is omitted here.

Note that the posture detecting device 50 is not restricted to being a load sensor which is provided on the connecting element, and may also use a film-type sensor sheet (tactile sensor) which is spread over a seating section and a seatback section of the driver's seat to measure pressure distribution, or an on-board camera which input an image of the driver's posture in the vehicle cabin. For instance, in the case of using a sensor sheet, it can be detected that the driver's posture has not changed if no change takes place in the pressure distribution on a surface of the driver's seat, and the driver's posture has been changed if a change takes place in the pressure distribution. Furthermore, in the case of using an on-board camera, the driver's behavior is monitored by image processing, and it can be detected that the driver's posture has changed when a change in the driver's posture is identified, such as when the driver turned his/her head. The posture detecting device 50 is the same as known devices, and thus a detailed description of the structure and the like is omitted here.

Furthermore, the seatbelt-wearing detection device 60 detects that a metal fitting attached to the seatbelt is fitted to a seatbelt buckle. The seatbelt-wearing detection device 60 detects if the seatbelt is worn by the driver based on, for example, an electric potential of a certain portion of a wiring of a detection circuit provided in the seatbelt buckle. Specifically, in the seatbelt-wearing detection device 60, the wiring of the detection circuit is grounded when the metal fitting is fitted. Therefore, the seatbelt-wearing detection device 60 checks if the high-side electric potential of the wiring of the detection circuit, with respect to the metal fitting, is on the high level side or the low level side. If it is at the low level, the seatbelt-wearing detection device 60 detects that the metal fitting is fitted to the seatbelt buckle. Note that, the seatbelt-wearing detection device 60 is also known and therefore a detailed description of the structure and the like is omitted.

The system that includes the braking force controller which achieves the vehicle stop retention control is structured as described above. Next, the braking force control performed by the braking force controller of the embodiment will be described with reference to FIG. 2.

Figure 2:
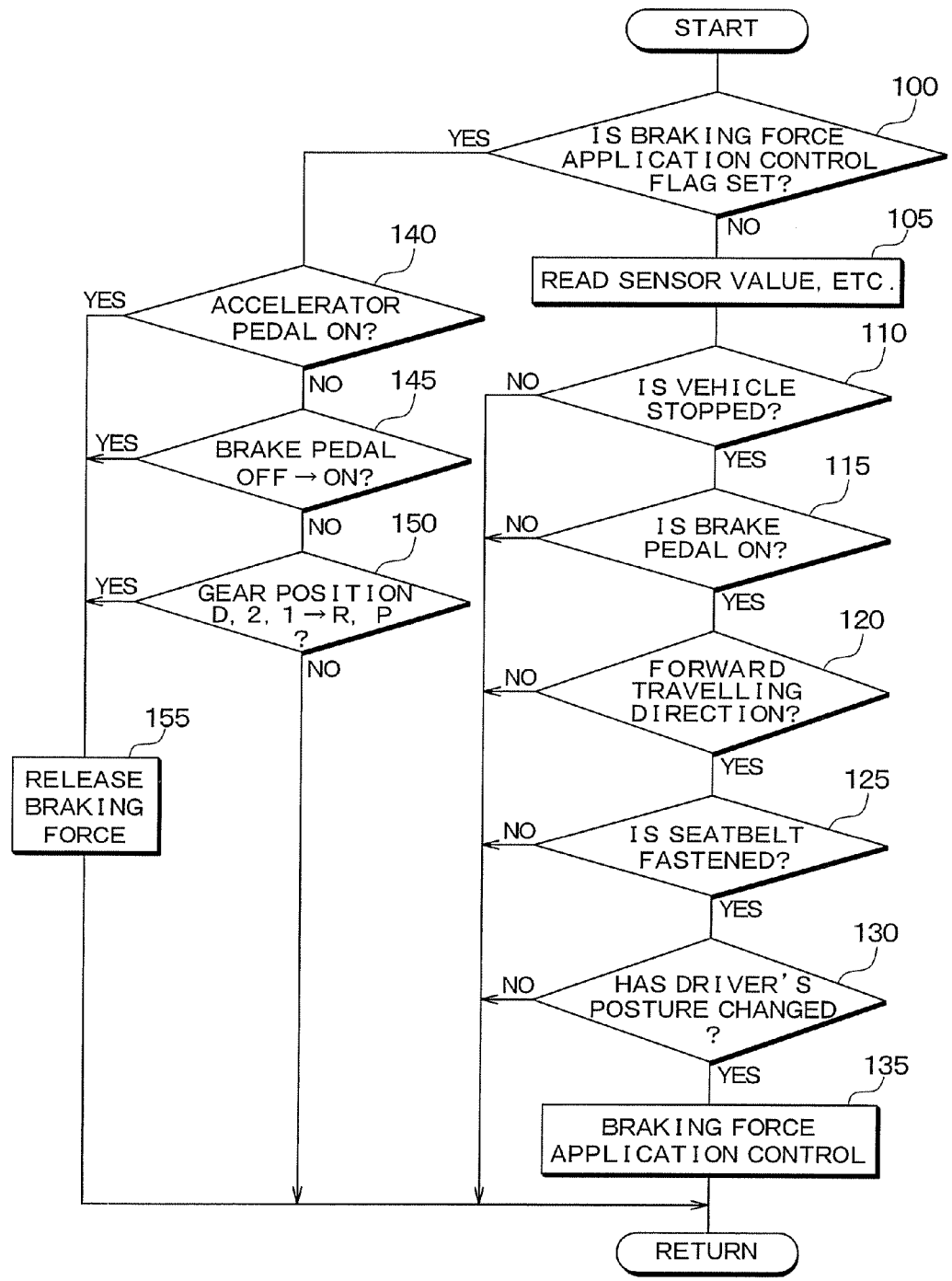
FIG. 2 is a flowchart of a vehicle stop retention control process performed by a brake ECU.

FIG. 2 is a flowchart that illustrates a vehicle stop retention control process performed by the brake ECU 40 that functions as the vehicle braking force controller of the embodiment. The process illustrated in this figure is performed at a predetermined cycle when, for example, an ignition switch (not shown in the figure) is turned on.

First, at step 100, it is determined whether or not a flag is set which indicates that the braking force application control is being performed. The flag is set at step 135 to be described later, and is placed in a reset state at the start of the vehicle stop retention control process. Therefore, the process proceeds to step 110.

At step 105, sensor values and the like are read. Specifically, detection signals from the brake switch 7*a*, the wheel speed sensors 8FR to 8RL, the posture detecting device 50, and the seatbelt-wearing detection device 60, information related to the accelerator opening degree obtained via the engine ECU 20 or detection signals from the accelerator switch 6*a*, and the gear position from the TM-ECU 30 are read.

At the following step 110, it is determined whether or not the vehicle is in a stopped state. More specifically, when the vehicle is stopped, there is a possibility that the stopped state may be maintained. On the other hand, if the vehicle is not stopped, there is no possibility that the stopped state will be maintained. Based on this, it is determined whether or not the vehicle is stopped. The vehicle stopped state is determined based on whether or not the vehicle speed calculated from each wheel speed indicated by the detection signals from the respective wheel speed sensors 8FR to 8RL is zero. If the vehicle speed is zero, the process proceeds to step 115, and if the vehicle speed is not zero, the process is terminated.

At step 115, it is determined whether or not the brake pedal 7 is turned on. The determination is made based on a detection signal of the brake switch 7*a*. More specifically, a stopped state needs to be maintained when depression of the brake pedal 7 is released from a state in which the braking pedal 7 is turned on, or when the brake pedal 7 is turned off. Therefore, at Step 115, it is determined whether or not the brake pedal 7 is turned on. If the determination is YES, the process proceeds to step 120. If the determination is NO, the process is terminated.

At step 120, it is determined whether or not a travelling direction is a forward direction. For instance, when the depression of the brake pedal 7 is released from a state in which the travelling direction is the forward direction, there is a possibility that the driver unintentionally released the depression of the brake pedal 7. On the other hand, if the depression of the brake pedal 7 is released when the travelling direction is in the backward direction, there is a high possibility that the driver is intentionally releasing the pedal depression to back the car into a garage or the like. Therefore, the vehicle stop retention is not performed when the travelling direction is the backward direction, and the vehicle stop retention is only performed when the travelling direction is the forward direction. The determination is made based on the gear position read from the TM-ECU 30. If the gear position indicates the forward direction such as the drive range (D), second range (2), and first range (1), the determination is YES. If the gear position does not indicate the forward direction, such as the rear range (R) and parking range (P), the determination is NO. In this case, if the determination is YES, the process proceeds to step 125, and if the determination is NO, the process is terminated.

At step 125, it is determined whether or not the seatbelt is being worn. For instance, when parallel parking, a driver may want to move the vehicle at a low speed while checking a parking space with a window open. In this case, it is quite likely that the driver will unbuckle his/her seatbelt, and intentionally let the vehicle creep. Accordingly, when the driver is not wearing the seatbelt, the vehicle stop retention is not performed. The vehicle stop retention is performed only when the driver is wearing the seatbelt. The determination is made based on a detection signal from the seatbelt-wearing detection device 60. When the metal fitting of the seatbelt is fitted to the seatbelt buckle and the determination is YES, the process proceeds to step 130. If the metal fitting of the seatbelt is not fitted to the seatbelt buckle and the determination is NO, the process is terminated.

At step 130, a determination is made as to whether or not the driver's posture has changed. When the driver's posture has changed while the brake pedal 7 is depressed, there is a possibility that the pedal depression will be released even if the driver does not intend to release the depression of the brake pedal 7. In this case, the driver does not want the vehicle to creep, and thus it is desirable to retain the stopped state. Therefore, the vehicle stop retention is performed when there is a change in the driver's posture. The determination is made based on a detection signal from the posture detecting device 50. When a change takes place in a load detected by each load sensor which forms the posture detecting device, for example, when a load change exceeds a threshold value that is assumed to indicate that the driver's posture has changed, the determination is YES. At this step, if the determination is YES, the process proceeds to step 135, and if the determination is NO, the process is terminated.

At step 135, the braking force application control is performed. Specifically, in order to retain the stopped state, the brake ECU 40 outputs a control signal to the brake control actuators 10FR to 10RL. As a result of this operation, a W/C pressure generated in the each of the W/Cs 11FR to 11RL is controlled, and a braking force required for retaining the stopped state is controlled with respect to respective wheels FR to RL. The braking force in this case may be a maximum force that can be generated by the brake control actuators 10FR to 10RL. However, the braking force is adequate if it is at least a minimum required braking force required for vehicle stop retention. If the braking force application control is performed in this manner, a flag that indicates execution of the control is set and the process is terminated.

Note that the minimum required braking force required for the vehicle stop retention refers to, when the vehicle is stopped on a flat road surface, a braking force equivalent to an engine output (creep torque) required for the vehicle to creep. The value of such braking force can be obtained based on the information related to the engine output received from the engine ECU 20. However, when the vehicle is stopped on an inclined road surface, the braking force is affected by the inclination. Therefore, a braking force which is equivalent to gravity acceleration that corresponds to the inclination angle must be added or subtracted from the engine output required for the creep of the vehicle. The inclination angle of the road surface can be measured by a known angle sensor or the like. Therefore, by obtaining the inclination angle of the road surface, the minimum required braking force required for the vehicle stop retention that corresponds to the inclination angle can be obtained.

As described above, the braking force application control is performed when there is a change in the driver's posture while the brake pedal is turned on in a state in which the vehicle is stopped. As a consequence, creep of the vehicle which is not intended by the driver can be inhibited when there is a change in the driver's posture even though the driver has no intention of releasing the depression of the brake pedal 7, for instance, when the driver turns to the rear seat side to get something. In addition, in the present embodiment, the vehicle stop retention is only performed when the travelling direction is the forward direction or when the seatbelt is worn by the driver. Consequently, the vehicle stop retention can be inhibited in cases when it is considered that the driver intentionally wants to let the vehicle creep.

When the braking force application control is performed as described above and the flag is set, the determination is YES at step 100, and the process proceeds to step 140 and the following processes. Then, at steps 140 to 150, a determination is made as to whether or not the conditions for cancelling the braking force application control are satisfied.

Specifically, at step 140, it is determined whether or not the accelerator pedal 6 is turned on. The determination is made based on whether or not the accelerator opening degree is larger than the accelerator on threshold value, or a detection signal from the accelerator switch 6a. When the accelerator pedal 6 is depressed, it is considered that the driver has no intention to retain the stopped state. Accordingly, when the determination is YES at this step, the process proceeds to step 155.

Furthermore, at step 145, it is determined whether or not the brake pedal 7 has been switched from on to off. The determination is made based on a detection signal from the brake switch 7a. In a case in which the brake pedal 7 is switched from on to off but then switched back from off to on, the brake pedal 7 is depressed again by the driver. Accordingly, the braking force generated by the depression of the brake pedal 7 is adequate. As a consequence, even when the determination is YES at step 145, the process proceeds to step 155.

Furthermore, at step 150, it is determined whether or not the gear position has changed from a position that indicates a forward direction such as the drive range (D), second range (2), and first range (1) to a position that indicates a non-forward direction such as the rear range (R) and parking range (P). In this case as well, it is considered that the driver intentionally wants to let the vehicle creep or is attempting to generate braking force by applying the parking brake. Therefore, if the determination is YES at step 150, the process proceeds to step 155.

Next, at step 155, in order to release the braking force, output of control signals from the brake ECU 40 to the brake control actuators 10FR to 10RL is stopped. Alternatively, a control signal for rotating an electric motor (not shown in the figures) in reverse is output. As a result, the vehicle stop retention is cancelled.

When the above described processing is performed, the vehicle stop retention control process is completed. Next, actual operation during performance of the vehicle stop retention control process is explained while comparing timing charts of various conditions illustrated in FIG. 3 to FIG. 6 and a timing chart of FIG. 7 which illustrates a case in which the vehicle stop retention control process is not performed.

Figure 3:
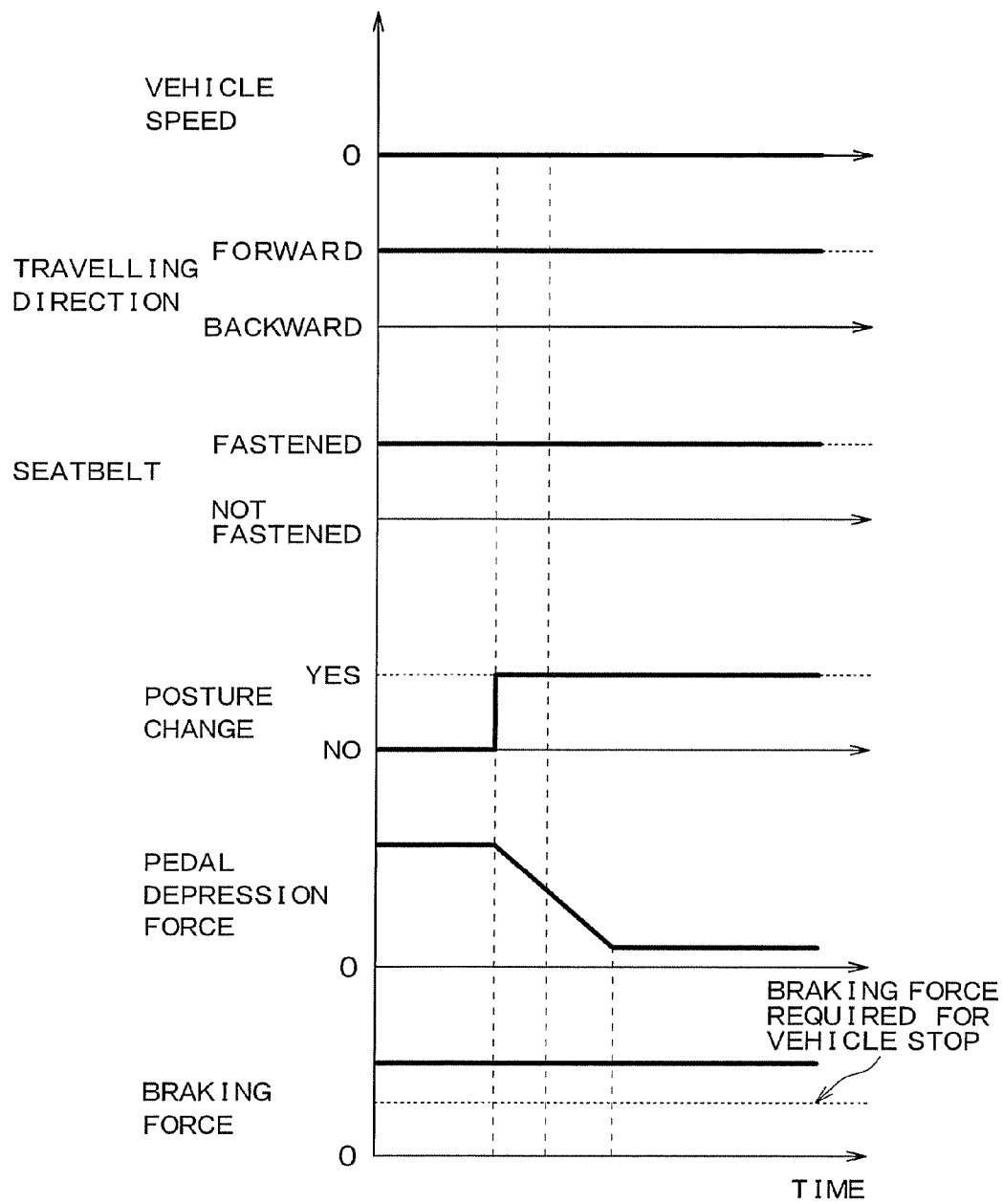
FIG. 3 is a timing chart illustrating an example of a case in which a driver's posture change takes place and depression of a brake pedal is released.

FIG. 3 illustrates a timing chart of a case in which a change takes place in the driver's posture and depression of the brake pedal 7 is released when the vehicle speed is zero, the brake pedal 7 is on, the traveling direction of the vehicle is the forward direction, and the seatbelt is worn. In this state, when the depression of the brake pedal 7 is released, it is considered that the pedal was released not by the driver's intention but was caused by the posture change. Therefore, as shown in FIG. 3, when the driver's posture change is detected, at least the minimum required braking force for the vehicle stop retention continues to be generated even when the depression of the brake pedal 7 is released and the depression force is reduced. As a result, the vehicle stop retention can be performed.

Figure 7:
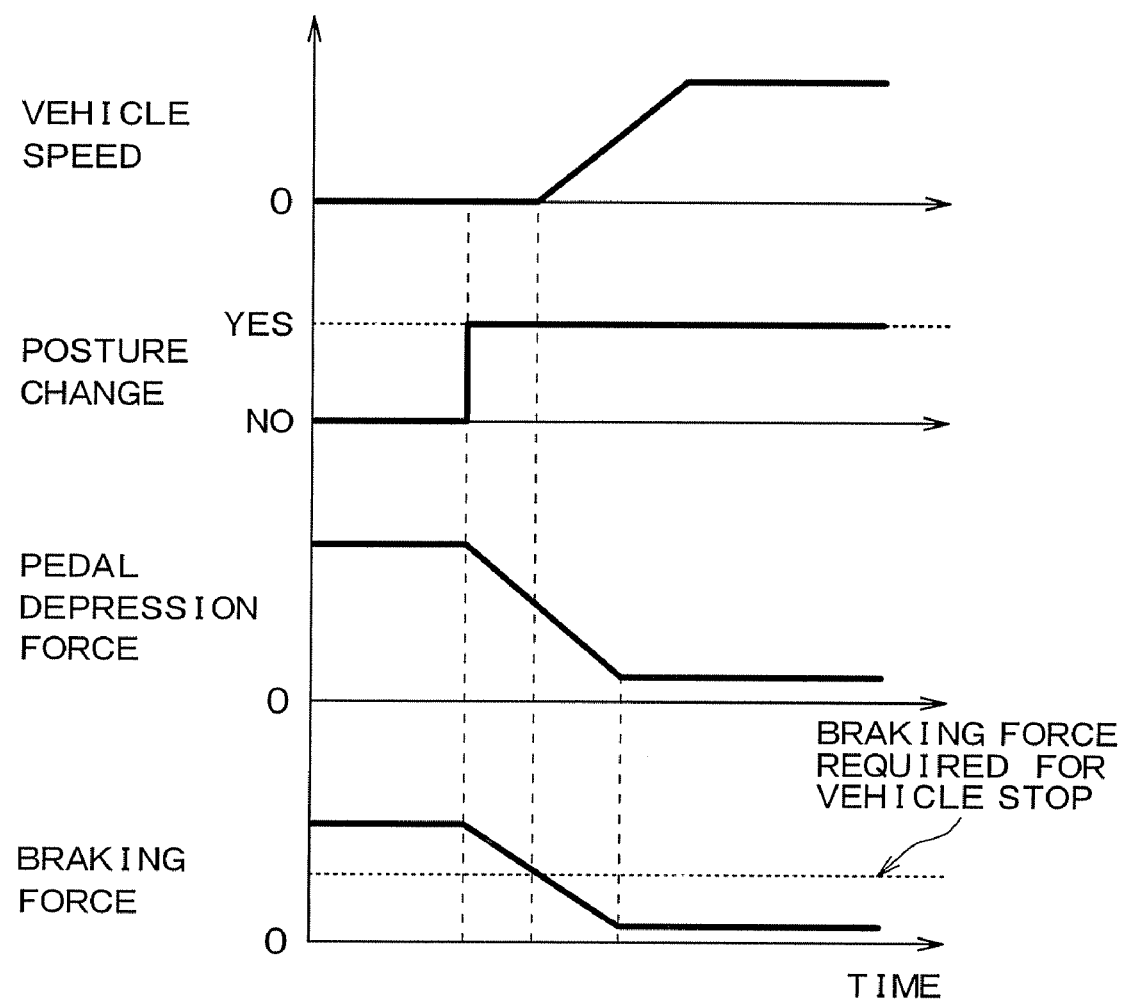
FIG. 7 is a timing chart of a case in which the vehicle stop retention control process is not performed.

On the other hand, as shown in FIG. 7, when the vehicle stop retention control process is not performed, the depression of the brake pedal 7 is released along with the driver's posture change, and thus the pedal depression force is reduced. Accordingly, the vehicle stop retention cannot be performed and the vehicle creeps. As a consequence, the vehicle may start moving even though the driver does not intend the vehicle to move.

Figure 4:
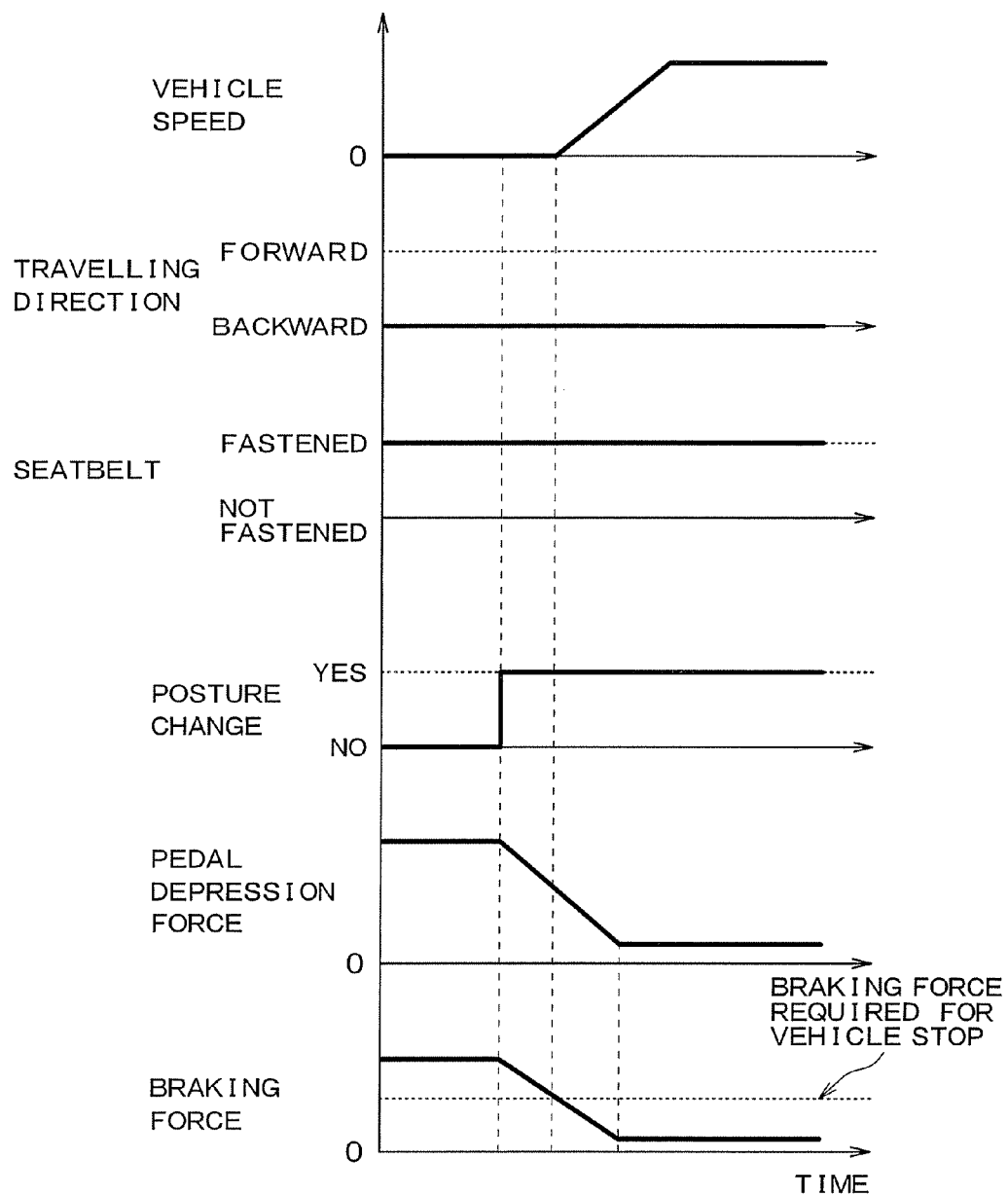
FIG. 4 is a timing chart illustrating another example of a case in which a driver's posture change takes place and depression of a brake pedal is released.

FIG. 4 illustrates a timing chart of a case in which a change takes place in the driver's posture and depression of the brake pedal 7 is released when the vehicle speed is zero, the brake pedal 7 is on, the seatbelt is worn, and the travelling direction of the vehicle is the backward direction. In this state, when the depression of the brake pedal 7 is released, it is considered that the pedal was intentionally released by the driver such as when backing the vehicle into a garage. Therefore, as shown in FIG. 4, even when the driver's posture change is detected, if the depression of the brake pedal 7 is released and the pedal depression force is reduced, the braking force decreases in correspondence to the pedal depression force. As a result, the vehicle can creep in line with the intention of the driver.

Figure 5:
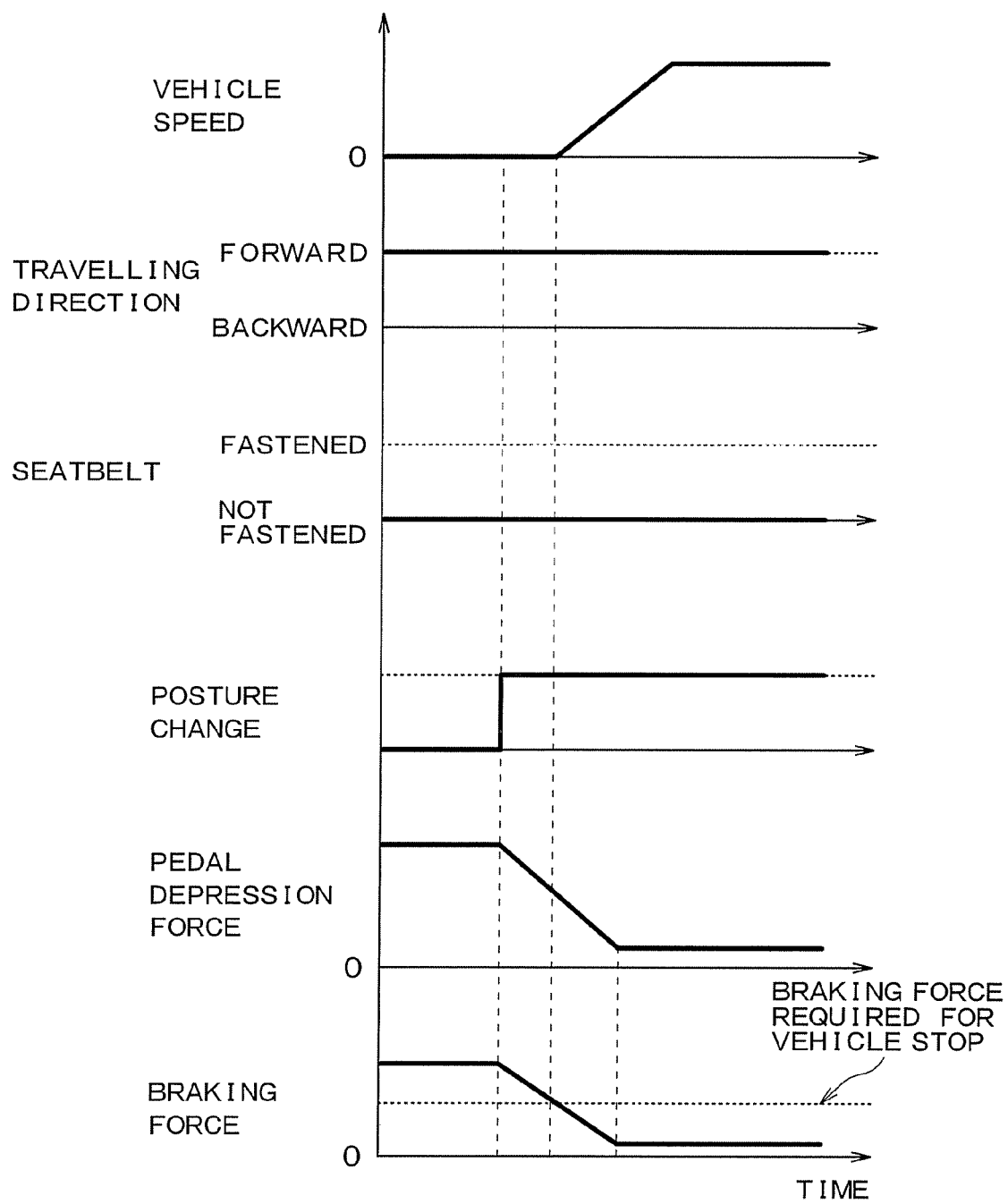
FIG. 5 is a timing chart illustrating yet another example of a case in which a driver's posture change takes place and depression of a brake pedal is released.

FIG. 5 illustrates a timing chart of a case in which a change takes place in the driver's posture and depression of the brake pedal 7 is released when the vehicle speed is zero, the brake pedal 7 is on, the travelling direction of the vehicle is the forward direction, and the seatbelt is not worn. In this state, when the depression of the brake pedal 7 is released, there is a high possibility that the pedal was intentionally released by the driver such as during parallel parking when the driver wants to run the vehicle at a low speed while checking a parking space with the window open. Therefore, as shown in FIG. 5, even when the driver's posture change is detected, if the depression of the brake pedal 7 is released and the pedal depression force is reduced, the braking force decreases in correspondence to the pedal depression force. As a result, the vehicle can creep in line with the intention of the driver.

Figure 6:
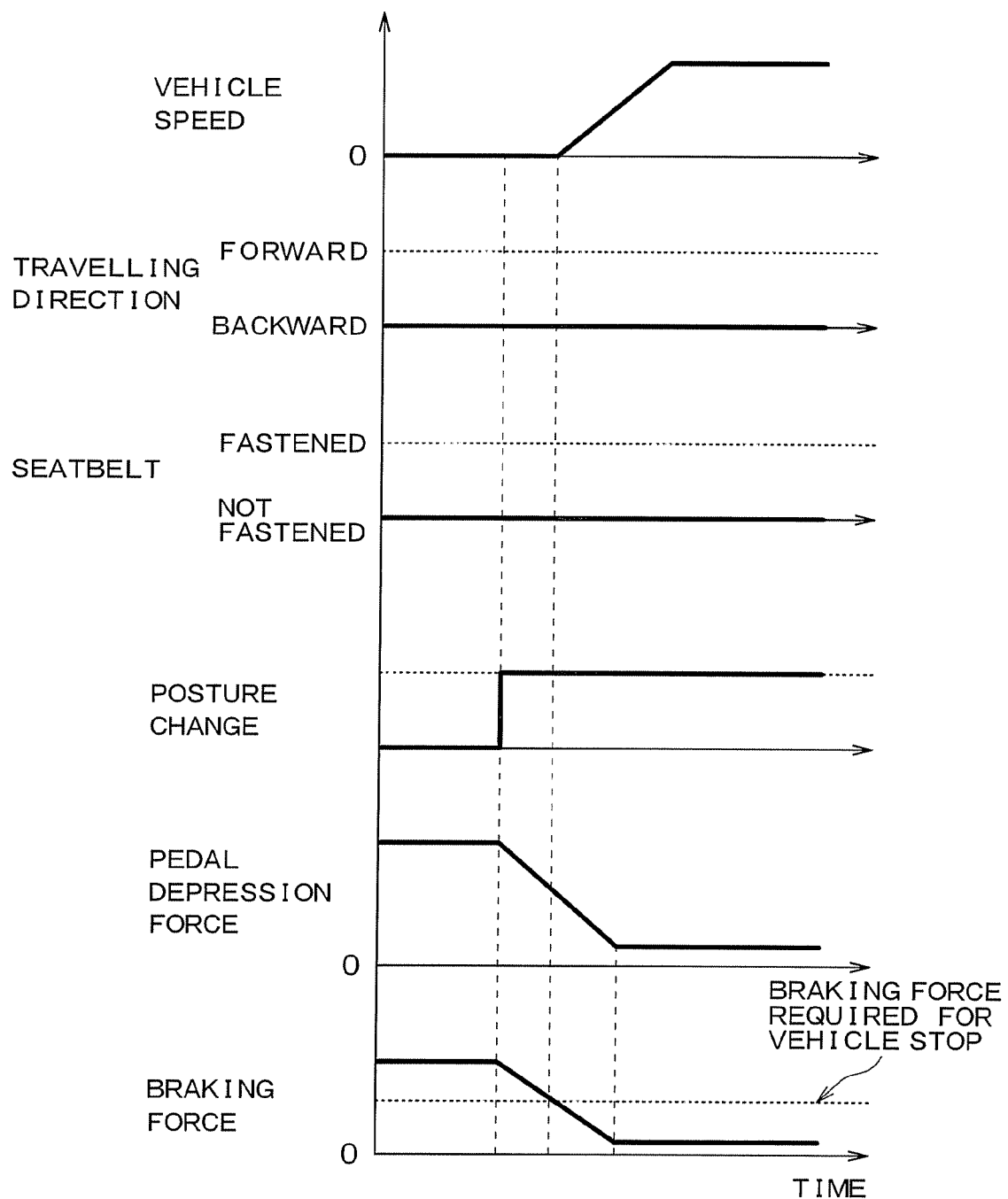
FIG. 6 is a timing chart illustrating still yet another example of a case in which a driver's posture change takes place and depression of a brake pedal is released.

FIG. 6 illustrates a timing chart of a case in which a change takes place in the driver's posture and depression of the brake pedal 7 is released when the vehicle speed is zero, the brake pedal 7 is on, the travelling direction of the vehicle is the backward direction, and the seatbelt is not worn. Also in this state, as with the cases of FIG. 4 and FIG. 5, even if the driver's posture change is detected, if the depression of the brake pedal 7 is released and the pedal depression force is reduced, the braking force decreases in correspondence to the pedal depression force. As a result, the vehicle can creep in line with the intention of the driver.

Figure 8:
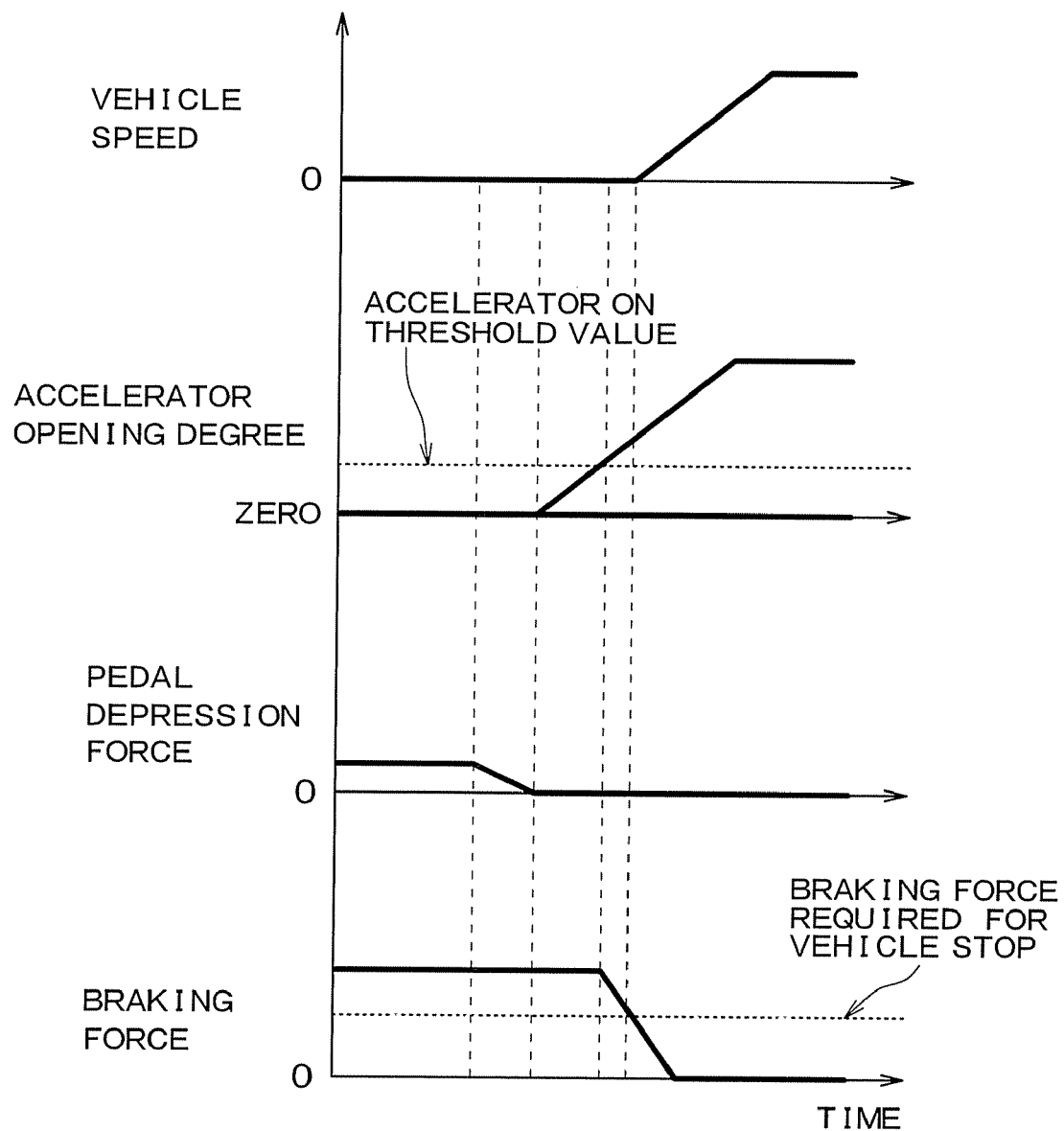
FIG. 8 is a timing chart of a case in which an accelerator pedal is turned on during execution of a braking force application control.

Note that, an operation performed when conditions for cancelling the braking force application control are satisfied after the braking force application control is performed by the vehicle stop retention control process is illustrated in FIG. 8.

FIG. 8 illustrates a timing chart of a case in which the accelerator pedal 6 is turned on during performance of the braking force application control. As shown in FIG. 8, the vehicle stop retention is performed until immediately before the accelerator pedal 6 is turned on, so that the vehicle speed is kept at zero. Meanwhile, at the same time, the determination is made that the accelerator opening degree has become larger than the accelerator on threshold value and the accelerator pedal 6 is turned on, the braking force application control is cancelled. As a consequence, the braking force is reduced, thereby achieving a vehicle speed that corresponds to the operation amount of the accelerator pedal 6.

As described above, in the present embodiment, when the vehicle is stopped, the braking force application control is performed if there is a change in the driver's posture while the brake pedal 7 is turned on. Therefore, when the driver has no intention of releasing the brake pedal 7, and when there is a change in the driver's posture such as when turning to the rear seat side to get something, creep of the vehicle that the driver does not intend to take place can be inhibited. Furthermore, in the present embodiment, the vehicle stop retention is performed only when the travelling direction is the forward direction and the seatbelt is worn. Therefore, the vehicle stop retention can be inhibited in cases in which it is considered that the driver intentionally wants to let the vehicle creep.

Other Embodiments

In the embodiment above, the braking force application control for the vehicle stop retention is performed when the travelling direction of the vehicle is the forward direction and the seatbelt is worn. However, the embodiment is just one example of how to travel the vehicle at low speed with the intention of the driver can be allowed. It does not necessarily mean that the braking force retention control for the vehicle stop retention is not performed unless the conditions mentioned above are satisfied. More specifically, the braking force retention control for the vehicle stop retention can be performed upon detection of the driver's posture change when the brake pedal 7 is on. Needless to say, if there are any other conditions that can be taken to indicate that the driver desires to let the vehicle creep, assuming that such conditions are not satisfied, the braking force application control for the vehicle stop retention can be performed.

Furthermore, in the embodiment above, when braking force is generated by the braking force application control, the brake control actuators 10FR to 10RL are driven to generate the braking force. However, the braking force can also be generated by using an electric parking brake or setting the gear position in the parking range (P) by the TM-ECU 30. In this case, the electric parking brake and the transmission 2 serve as the braking force application control portion.

Note that the steps illustrated in the figures correspond to portion for performing the relevant processes.

While the above description is of the preferred embodiments of the present invention, it should be appreciated that the invention may be modified, altered, or varied without deviating from the scope and fair meaning of the following claims.

What is claimed is:
1. A vehicle braking force controller comprising:
  a stop determination portion for determining that the vehicle is stopped;
  a brake operation detection portion for detecting whether a brake pedal is operated;
  a posture change detection portion for detecting a change in a driver's posture; and
  a braking force application control portion for transmitting a control signal to a braking force generation portion capable of generating a braking force, regardless of whether the brake pedal is operated by the driver, and applying the braking force to the vehicle, wherein once a change in the driver's posture is detected by the posture change detection portion in a state in which the vehicle is determined to be in a stopped state by the stop determination portion and the operation of the brake pedal is detected by the brake operation detection portion, the braking force application control portion transmits the control signal to the braking force generation portion to apply the braking force and perform vehicle stop retention.

2. The vehicle braking force controller according to claim 1, further comprising:

a travelling direction detection portion for detecting a travelling direction of the vehicle, wherein the vehicle stop retention is performed when the travelling direction detection portion detects that the travelling direction is a forward direction, and the vehicle stop retention is not performed when the travelling direction detection portion detects that the travelling direction is a backward direction.

3. The vehicle braking force controller according to claim 2, further comprising:

a seatbelt-wearing detection portion for detecting whether a seatbelt of a driver's seat on which the driver sits is worn, wherein the vehicle stop retention is performed when the seatbelt-wearing detection portion detects that the seatbelt is worn, and the vehicle stop retention is not performed when the seatbelt-wearing detection portion detects that the seatbelt is not worn.

4. The vehicle braking force controller according to claim 3, wherein the braking force application control portion outputs the control signal to brake control actuators and drives the brake control actuators to generate the braking force.

5. The vehicle braking force controller according to claim 3, wherein the braking force application control portion outputs the control signal to an electric parking brake and drives the electric parking brake to generate the braking force.

6. The vehicle braking force controller according to claim 3, wherein the braking force application control portion outputs the control signal to a transmission serving as the braking force generation portion and sets a gear position of the transmission in a parking range to generate the braking force.

7. The vehicle braking force controller according to claim 3, wherein the braking force application control portion outputs the control signal to at least one of brake control actuators, an electric parking brake, and a transmission serving as the braking force generation portion, and drives the brake control actuators and the electric parking brake and sets a gear position of the transmission in a parking range to generate the braking force.

8. The vehicle braking force controller according to claim 2, wherein the braking force application control portion outputs the control signal to brake control actuators and drives the brake control actuators to generate the braking force.

9. The vehicle braking force controller according to claim 2, wherein the braking force application control portion outputs the control signal to an electric parking brake and drives the electric parking brake to generate the braking force.

10. The vehicle braking force controller according to claim 2, wherein the braking force application control portion outputs the control signal to a transmission serving as the braking force generation portion and sets a gear position of the transmission in a parking range to generate the braking force.

11. The vehicle braking force controller according to claim 2, wherein the braking force application control portion outputs the control signal to at least one of brake control actuators, an electric parking brake, and a transmission serving as the braking force generation portion, and drives the brake control actuators and the electric parking brake and sets a gear position of the transmission in a parking range to generate the braking force.

12. The vehicle braking force controller according to claim 1, further comprising:

a seatbelt-wearing detection portion for detecting whether a seatbelt of a driver's seat on which the driver sits is worn, wherein the vehicle stop retention is performed when the seatbelt-wearing detection portion detects that the seatbelt is worn, and the vehicle stop retention is not performed when the seatbelt-wearing detection portion detects that the seatbelt is not worn.

13. The vehicle braking force controller according to claim 12, wherein the braking force application control portion outputs the control signal to brake control actuators and drives the brake control actuators to generate the braking force.

14. The vehicle braking force controller according to claim 12, wherein the braking force application control portion outputs the control signal to an electric parking brake and drives the electric parking brake to generate the braking force.

15. The vehicle braking force controller according to claim 12, wherein the braking force application control portion outputs the control signal to a transmission serving as the braking force generation portion and sets a gear position of the transmission in a parking range to generate the braking force.

16. The vehicle braking force controller according to claim 12, wherein the braking force application control portion outputs the control signal to at least one of brake control actuators, an electric parking brake, and a transmission serving as the braking force generation portion, and drives the brake control actuators and the electric parking brake and sets a gear position of the transmission in a parking range to generate the braking force.

17. The vehicle braking force controller according to claim 1, wherein the braking force application control portion outputs the control signal to brake control actuators and drives the brake control actuators to generate the braking force.

18. The vehicle braking force controller according to claim 1, wherein the braking force application control portion outputs the control signal to an electric parking brake and drives the electric parking brake to generate the braking force.

19. The vehicle braking force controller according to claim 1, wherein the braking force application control portion outputs the control signal to a transmission serving as the braking force generation portion and sets a gear position of the transmission in a parking range to generate the braking force.

20. The vehicle braking force controller according to claim 1, wherein
the braking force application control portion outputs the control signal to at least one of brake control actuators, an electric parking brake, and a transmission serving as the braking force generation portion, and drives the brake control actuators and the electric parking brake and sets a gear position of the transmission in a parking range to generate the braking force.

* * * * *